United States Patent
Liu et al.

(10) Patent No.: US 12,140,269 B2
(45) Date of Patent: Nov. 12, 2024

(54) VERTICAL-TILT MECHANISM FOR DISPLAY MOUNT WITH ECCENTRIC GEAR

(71) Applicant: Shenzhen Bestqi Innovation Technology Co., Ltd., Shenzhen (CN)

(72) Inventors: Cheng Liu, Shenzhen (CN); Yuan Huo, Shenzhen (CN)

(73) Assignee: Bestqi Innovation Technology (Shenzhen) Co., Ltd., Shenzhen (CN)

( * ) Notice: Subject to any disclaimer, the term of this patent is extended or adjusted under 35 U.S.C. 154(b) by 0 days.

(21) Appl. No.: 18/325,528

(22) Filed: May 30, 2023

(65) Prior Publication Data
US 2024/0218962 A1     Jul. 4, 2024

(30) Foreign Application Priority Data
Dec. 29, 2022   (CN) .......................... 202211705667.2

(51) Int. Cl.
*F16M 11/12*     (2006.01)
*F16M 11/20*     (2006.01)

(52) U.S. Cl.
CPC ....... *F16M 11/126* (2013.01); *F16M 11/2014* (2013.01); *F16M 2200/041* (2013.01)

(58) Field of Classification Search
CPC ...... F16M 11/10; F16M 11/18; F16M 11/046; F16M 11/121; F16M 11/125; F16M 11/126; F16M 11/128; F16M 11/2014; F16M 11/2021; F16M 2200/041
See application file for complete search history.

(56) References Cited

U.S. PATENT DOCUMENTS

| | | | |
|---|---|---|---|
| 3,973,748 A | | 8/1976 | Nagasaka |
| 5,895,021 A | * | 4/1999 | Rosenband ............ F16M 11/18 |
| | | | 248/349.1 |

(Continued)

FOREIGN PATENT DOCUMENTS

| | | |
|---|---|---|
| EP | 1331431 A2 | 7/2003 |
| KR | 20030079042 A | 10/2003 |

(Continued)

OTHER PUBLICATIONS

International Search Report and Written Opinion received for PCT Patent Application No. PCT/CN2023/142176, mailed Apr. 4, 2024, 12 pages.

(Continued)

*Primary Examiner* — Eret C McNichols
(74) *Attorney, Agent, or Firm* — Husch Blackwell LLP

(57) ABSTRACT

A device for mounting an electronic display to a wall includes: a fixing plate defining an inner gear wheel; a display-mounting bracket configured to vertically tilt relative to the fixing plate, the display-mounting bracket having a proximal extension with an eccentric gear having a locking shaft, the eccentric gear being configured to engage with the inner gear wheel; a spring coupled between the main fixing plate and the locking shaft such that the spring retains a vertical-tilt orientation of the display-mounting bracket relative to the main fixing plate; and an adjustment screw coupled to the lower end of the tension spring, wherein rotation of the adjustment screw expands or compresses the spring.

20 Claims, 14 Drawing Sheets

(56) References Cited

U.S. PATENT DOCUMENTS

| | | | |
|---|---|---|---|
| 6,354,552 B1* | 3/2002 | Chiu | F16M 11/18 |
| | | | 248/422 |
| 6,695,274 B1 | 2/2004 | Chiu | |
| 6,905,101 B1* | 6/2005 | Dittmer | F16M 11/10 |
| | | | 248/125.7 |
| 7,209,344 B2 | 4/2007 | Hillman et al. | |
| 7,316,379 B1 | 1/2008 | Graham | |
| 7,395,996 B2* | 7/2008 | Dittmer | F16M 11/10 |
| | | | 248/291.1 |
| 7,398,950 B2* | 7/2008 | Hung | F16M 13/027 |
| | | | 248/921 |
| 7,417,695 B2* | 8/2008 | Cheng | F16M 11/10 |
| | | | 349/60 |
| 7,487,943 B1* | 2/2009 | Gillespie | F16M 11/10 |
| | | | 248/920 |
| 7,513,469 B1* | 4/2009 | Ciungan | F16M 11/10 |
| | | | 248/161 |
| 7,641,163 B2* | 1/2010 | O'Keene | F16M 11/10 |
| | | | 248/920 |
| 7,823,847 B2 | 11/2010 | Bremmon et al. | |
| 7,954,780 B2* | 6/2011 | Dittmer | F16M 11/10 |
| | | | 248/299.1 |
| 8,011,632 B2* | 9/2011 | Wang | F16M 11/10 |
| | | | 248/920 |
| 8,028,964 B2* | 10/2011 | Monaco | F16M 11/10 |
| | | | 248/921 |
| 8,072,739 B2* | 12/2011 | Dittmer | F16M 11/10 |
| | | | 361/679.04 |
| 8,136,776 B2* | 3/2012 | Kim | F16M 11/10 |
| | | | 248/299.1 |
| 8,245,990 B2* | 8/2012 | Huang | F16M 13/02 |
| | | | 248/920 |
| 8,262,044 B2* | 9/2012 | Luijben | F16M 11/10 |
| | | | 248/920 |
| RE43,696 E | 10/2012 | Graham | |
| 8,456,808 B2 | 6/2013 | Grey et al. | |
| 8,659,884 B2* | 2/2014 | Segar | F16M 11/22 |
| | | | 361/679.22 |
| 8,693,172 B2* | 4/2014 | Russell | F16M 11/2085 |
| | | | 361/679.01 |
| 8,746,635 B2* | 6/2014 | Kim | F16M 11/10 |
| | | | 361/679.01 |
| 8,864,092 B2 | 10/2014 | Newville | |
| 8,888,062 B2* | 11/2014 | Novin | F16M 11/2014 |
| | | | 361/679.01 |
| 8,891,249 B2 | 11/2014 | Stanek et al. | |
| 8,925,154 B2 | 1/2015 | Ergun | |
| 8,958,200 B2 | 2/2015 | Bremmon et al. | |
| 9,316,346 B2 | 4/2016 | Lau et al. | |
| 9,371,955 B2* | 6/2016 | Fu | H05K 5/0204 |
| 9,699,924 B2 | 7/2017 | Hagen | |
| 9,759,376 B2 | 9/2017 | Xiang et al. | |
| 9,765,923 B2 | 9/2017 | Skull et al. | |
| 9,791,095 B2* | 10/2017 | Chen | F16M 11/105 |
| 10,024,490 B2 | 7/2018 | Lam et al. | |
| RE47,043 E | 9/2018 | Graham | |
| 10,104,963 B2 | 10/2018 | Brandt et al. | |
| 10,563,811 B2* | 2/2020 | Pei | F16M 11/2085 |
| 10,595,634 B2 | 3/2020 | Pei | |
| 10,845,000 B2 | 11/2020 | Lau | |
| 11,178,354 B2 | 11/2021 | Massey | |
| 11,629,811 B2* | 4/2023 | Huang | F16M 11/041 |
| | | | 248/122.1 |
| 2005/0133678 A1* | 6/2005 | Dittmer | F16M 11/38 |
| | | | 248/274.1 |
| 2007/0090250 A1* | 4/2007 | O'Keene | F16M 11/10 |
| | | | 248/299.1 |
| 2007/0252919 A1 | 11/2007 | McGreevy | |
| 2008/0001048 A1* | 1/2008 | Woo | F16M 11/18 |
| | | | 248/276.1 |
| 2008/0101853 A1* | 5/2008 | Huang | F16M 11/10 |
| | | | 403/92 |
| 2009/0173860 A1* | 7/2009 | Remy | F16M 11/2014 |
| | | | 248/278.1 |
| 2010/0001153 A1* | 1/2010 | Stenhouse | F16M 11/10 |
| | | | 248/222.13 |
| 2011/0108688 A1* | 5/2011 | Parruck | F16M 13/02 |
| | | | 248/217.4 |
| 2011/0260028 A1* | 10/2011 | Atallah | F16M 11/24 |
| | | | 248/371 |
| 2013/0048811 A1* | 2/2013 | Tseng | F16M 11/2014 |
| | | | 248/220.21 |
| 2013/0126685 A1* | 5/2013 | Lucas | F16M 11/041 |
| | | | 29/525.02 |
| 2013/0314890 A1* | 11/2013 | Smith | F16M 11/2014 |
| | | | 361/825 |
| 2014/0001331 A1 | 1/2014 | Oddsen, Jr. et al. | |
| 2016/0186923 A1 | 6/2016 | Lau et al. | |
| 2016/0348834 A1 | 12/2016 | Xiang et al. | |
| 2022/0378546 A1* | 12/2022 | Haines | F16M 11/18 |
| 2023/0031835 A1* | 2/2023 | Lu | F16M 11/18 |
| 2023/0090013 A1* | 3/2023 | Christensen | F16M 11/24 |
| | | | 248/125.8 |
| 2023/0225504 A1 | 7/2023 | Pan | |
| 2024/0142045 A1* | 5/2024 | Pei | F16M 13/02 |
| 2024/0143023 A1* | 5/2024 | Lau | F16M 11/126 |
| 2024/0191828 A1* | 6/2024 | Massey | F16M 11/04 |

FOREIGN PATENT DOCUMENTS

| | | | | |
|---|---|---|---|---|
| KR | 100478578 B1 | 3/2005 | | |
| KR | 20100072878 A | 7/2010 | | |
| TW | M323552 U2 | 12/2007 | | |
| WO | 2007095950 A1 | 8/2007 | | |
| WO | WO-2008007989 A1 * | 1/2008 | | F16M 11/10 |
| WO | 2018081686 A1 | 5/2018 | | |

OTHER PUBLICATIONS

Full Motion TV Wall Mount for 42"-90" TVs, SANUS, Available Online at: <https://www.sanus.com/en_US/products/tv-mounts/vlf728/>, Retrieved Jun. 4, 2024, 1 page.

BXT1 Instruction Manual, SANUS, 2015, 28 pages.

International Search Report and Written Opinion received for PCT Patent Application No. PCT/CN2023/142187, mailed May 24, 2024, 12 pages.

* cited by examiner

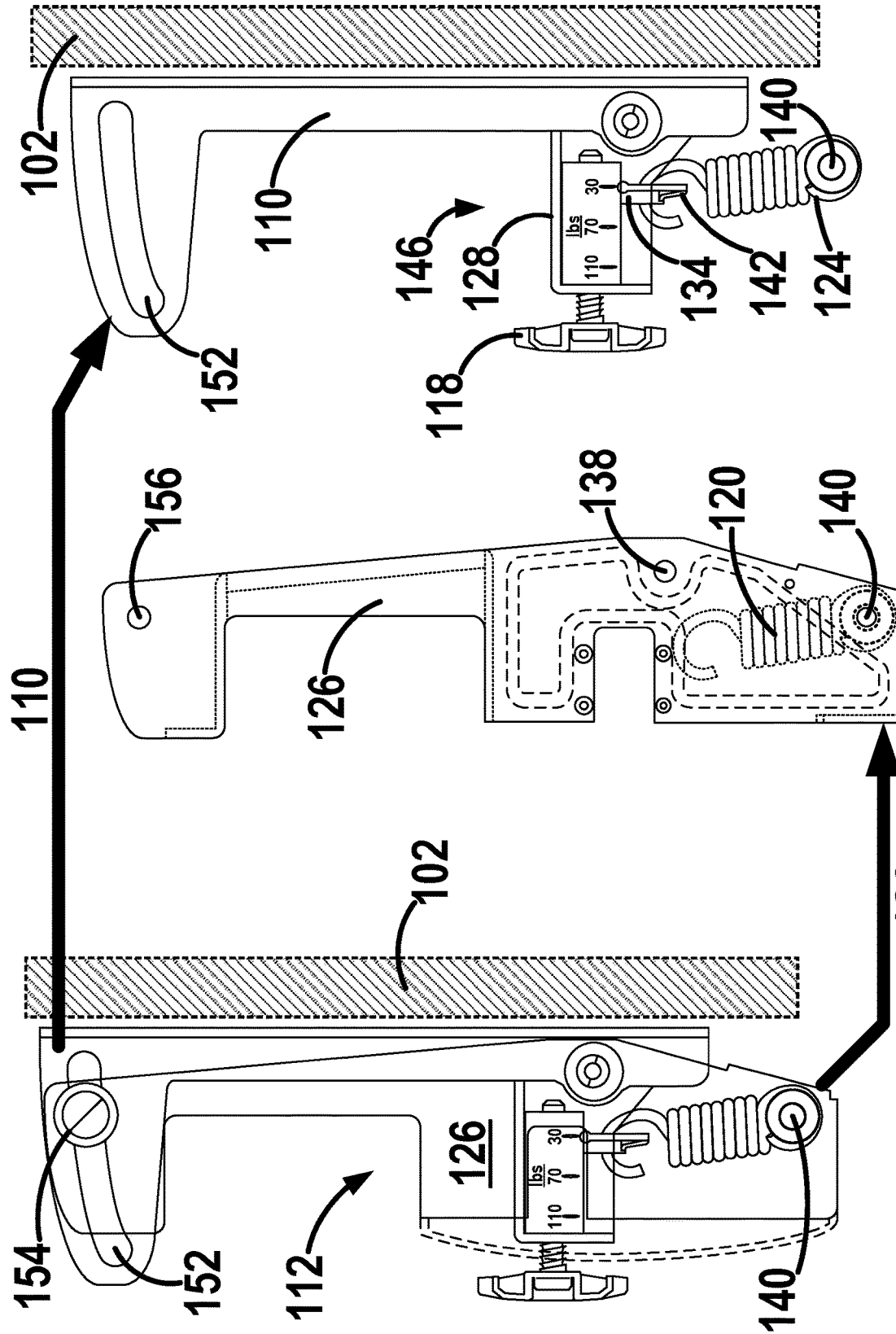

VERTICAL-TILT MECHANISM FOR DISPLAY MOUNT WITH ECCENTRIC GEAR

PRIORITY CLAIM

This application claims priority from Chinese Patent Application No. 2022/11705667.2, filed Dec. 29, 2022 and entitled, "DISPLAY BRACKET VERTICAL TILT MECHANISM WITH ECCENTRIC GEAR," the entire contents of which are incorporated herein by reference.

TECHNICAL FIELD

The present disclosure generally relates to mounting devices, and in particular, wall-mounting devices for electronic displays.

BACKGROUND

Unlike traditional cathode-ray tube (CRT) televisions, modern flat-screen displays are typically light enough and flat enough to be directly mounted onto a wall, thereby greatly expanding the options for placement within a particular room. Some available mounting systems include extendable or collapsible arms, enabling the display to be extended outwardly from the wall, as well as features that enable the display to be translated vertically upward or downward, according to user preference.

SUMMARY

In general, the present disclosure details example spring-based counterbalancing devices, systems, and techniques for enhancing the stability of a flat-screen television (or other flat-screen electronic display) while in a vertically tilted orientation when mounted to a wall. The spring-based counterbalancing devices of this disclosure dampen and reduce oscillation of displays and permit the displays to more securely remain in tilted orientations. The spring-based counterbalancing devices of this disclosure further permit adjustment of the vertical tilt orientation of electronic displays with ease, such that, for example, once a television is attached to a display mount, and an adjustment screw turned to modify the orientation and amplitude of the counterbalancing force of the spring in correspondence to the weight of the television, the television may be manually tilted by a user at will (e.g., vertically angled, relative to the wall), without requiring any additional user input such as modifying other screws or nuts. Thus, the spring-based counterbalancing device of this disclosure may be used with a significant range of weights of electronic displays, with only a single adjustment of a screw needed to secure a display. Moreover, the invention of the disclosure enhances the durability of the tilt mechanism and mount in general, as it provides a counterbalancing force in addition to friction that may be present at a pivot point of the vertical-tilt mechanism.

As one non-limiting example, a device includes: a main fixing plate configured to be coupled to a wall-mounting bracket, the main fixing plate comprising an inner gear wheel; a display-mounting bracket configured to removably couple to a backside of an electronic display, wherein: the display-mounting bracket is configured to vertically tilt, relative to the main fixing plate, about a tilt axis passing through a pivot point of both the display-mounting bracket and the main fixing plate, the display-mounting bracket comprises a proximal extension extending proximally to the pivot point, and the proximal extension comprises an eccentric gear comprising a locking shaft, the eccentric gear being configured to engage with the inner gear wheel of the main fixing plate; a tension spring comprising a lower end coupled to the main fixing plate, and an upper end coupled to the locking shaft of the eccentric gear, such that the tension spring retains a vertical-tilt orientation of the display-mounting bracket relative to the main fixing plate; and an adjustment screw coupled to the lower end of the tension spring, wherein rotation of the adjustment screw expands or compresses the tension spring.

As another example, a system includes: a wall-mounting bracket configured to removably couple to a wall; a main fixing plate coupled to the wall-mounting bracket, the main fixing plate comprising an inner gear wheel; a display-mounting bracket configured to removably couple to a backside of an electronic display, wherein: the display-mounting bracket is configured to vertically tilt, relative to the main fixing plate, about a tilt axis passing through a pivot point of both the display-mounting bracket and the main fixing plate, the display-mounting bracket comprises a proximal extension extending proximally to the pivot point, and the proximal extension comprises an eccentric gear comprising a locking shaft, the eccentric gear being configured to engage with the inner gear wheel of the main fixing plate; a tension spring comprising a lower end coupled to the main fixing plate, and an upper end coupled to the locking shaft of the eccentric gear, such that the tension spring retains a vertical-tilt orientation of the display-mounting bracket relative to the main fixing plate; and an adjustment screw coupled to the lower end of the tension spring, wherein rotation of the adjustment screw expands or compresses the tension spring.

The techniques of this disclosure are configured to meet the requirements of most users, in that the vertical-tilt angle of the display mount can easily and arbitrarily be adjusted to accommodate electronic displays of virtually any size and weight. That is, after an initial balancing calibration, the systems herein enable low-effort manual adjustment of the television's vertical-tilt angle without requiring any additional tools.

The above summary is not intended to describe each illustrated example or every implementation of the subject matter hereof. The figures and the detailed description that follow more particularly exemplify various aspects in accordance with this disclosure.

BRIEF DESCRIPTION OF THE DRAWINGS

Subject matter hereof may be more thoroughly understood in consideration of the following detailed description of various examples in connection with the accompanying figures, in which:

FIG. 4A is a transparent side view of the vertical-tilt mechanism of FIG. 1A.

FIG. 4B is a transparent side view of a main fixing plate of the vertical-tilt mechanism of FIG. 4A.

FIG. 4C is a transparent side view of a display-mounting bracket of the vertical-tilt mechanism of FIG. 4A, as coupled to an electronic display.

Figure 1A:
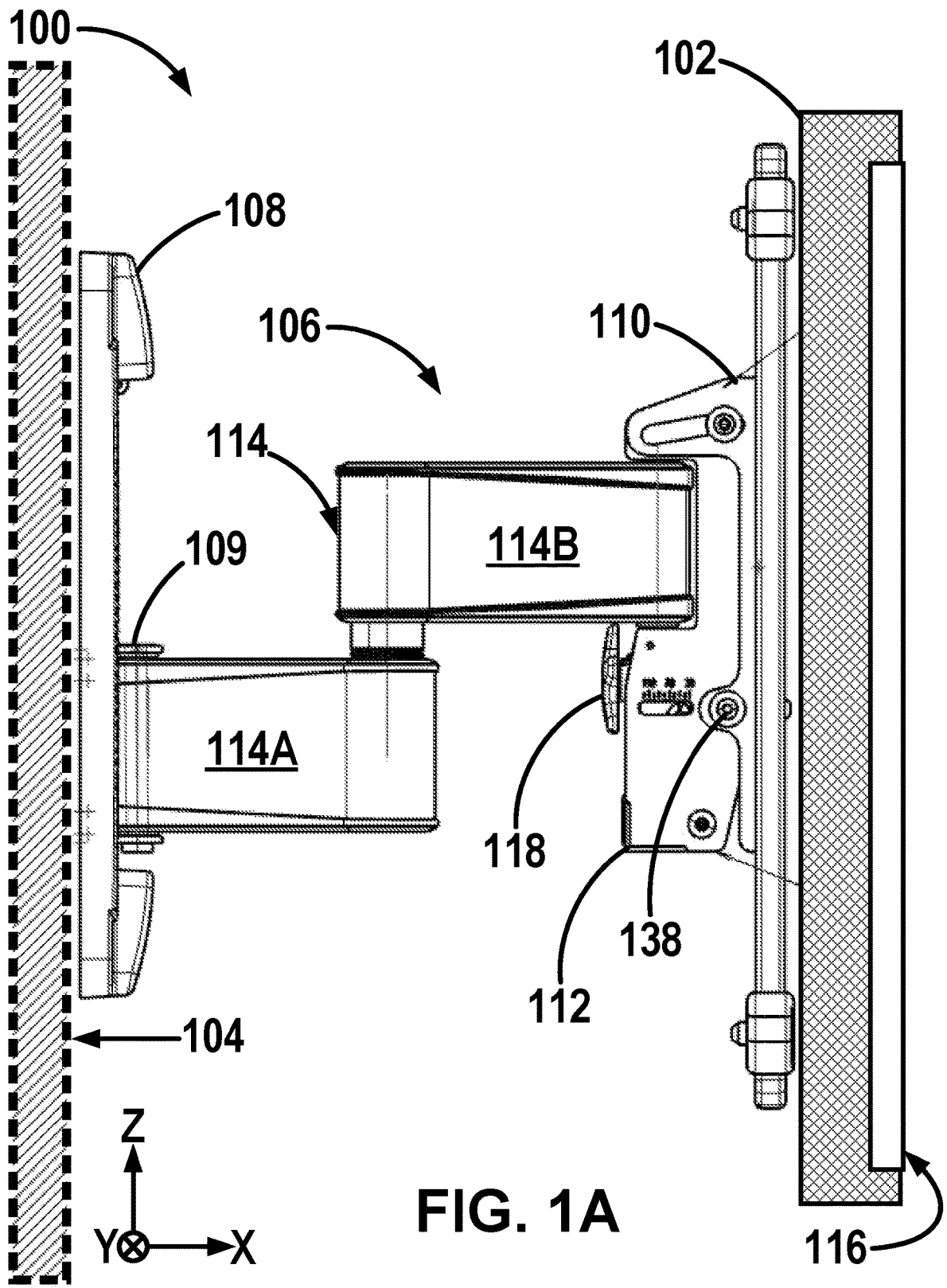
FIG. 1A is a side view of an example wall-mounting system for an electronic display, including a mounting device with a spring-balanced vertical-tilt mechanism.

While various examples are amenable to various modifications and alternative forms, specifics thereof have been shown by way of example in the drawings and will be described in detail. It should be understood, however, that the intention is not to limit the claimed inventions to the particular examples described. On the contrary, the intention is to cover all modifications, equivalents, and alternatives falling within the spirit and scope of the subject matter of the present disclosure.

DETAILED DESCRIPTION

Figure 1B:
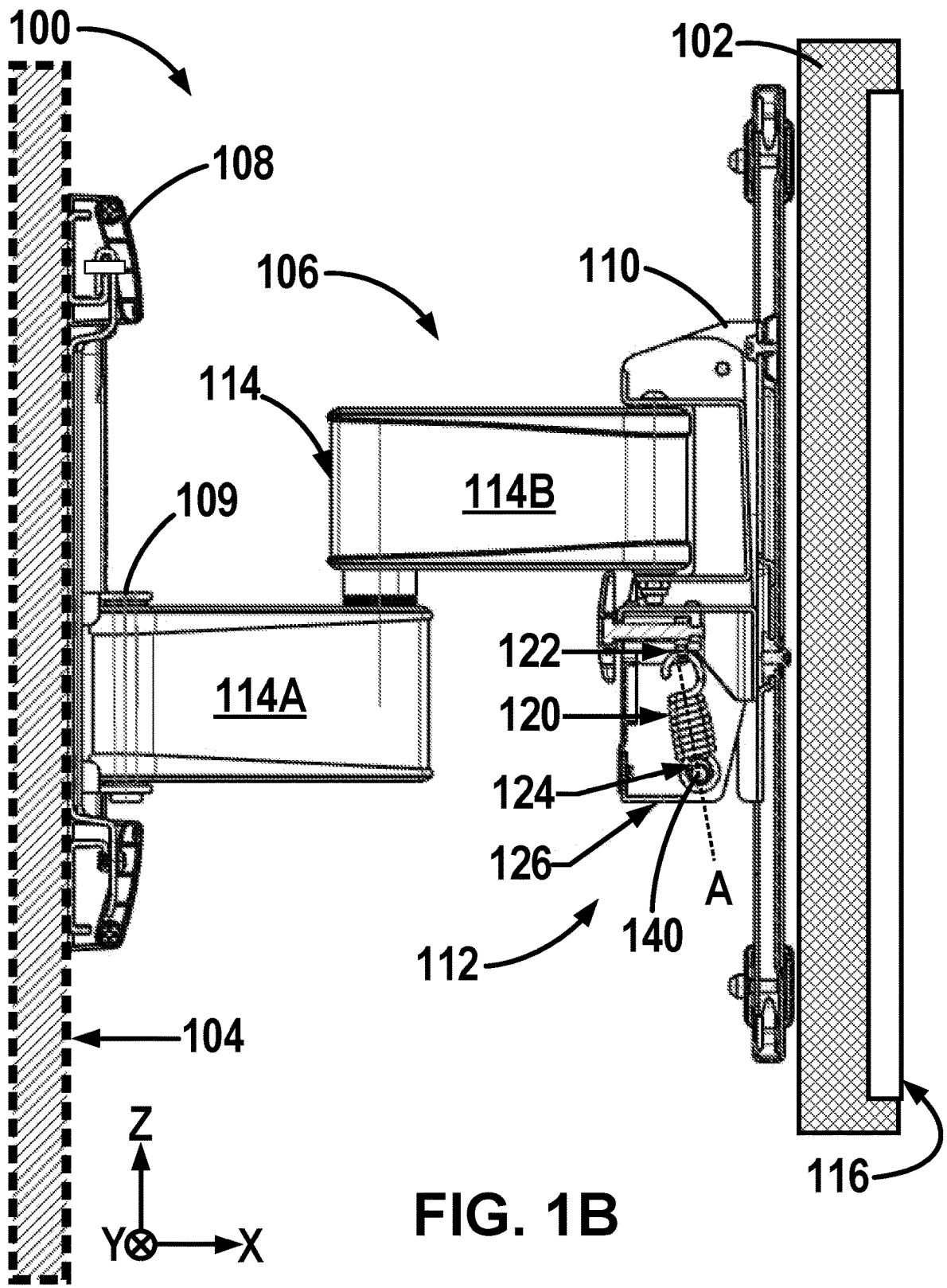
FIG. 1B is a transparent side view of the wall-mounting system of FIG. 1A, illustrating example internal components of the vertical-tilt mechanism.

The present disclosure is directed to spring-based counterbalancing devices, systems, and techniques for mounting a flat-screen television (or other flat-screen electronic display) to a wall, such that the television may be manually tilted (e.g., vertically angled, relative to the wall) at will, e.g., without requiring additional user input. For instance, FIG. 1A is a side view, and FIG. 1B is a semi-transparent side view, of a first example wall-mounting system 100 for adjustably coupling an electronic display 102, such as a television, computer screen, or other similar "flat-panel" electronic display, to a wall 104 (or any other suitable planar surface). For ease-of-reference, an X-Y-Z coordinate system is provided. For instance, wall 104 defines a planar surface that is parallel to the Y-Z plane. As used throughout this disclosure, the term "proximal" refers to the negative-X-axis direction, e.g., from electronic display 102 toward wall 104, and the term "distal" refers to the positive-X-axis direction, e.g., away from wall 104 and toward display 102.

In general, mounting system 100 includes mounting device 106 that defines vertical-tilt mechanism 112. In the example illustrated in FIGS. 1A and 1B, mounting system 100 further includes wall-mounting bracket 108 and one or more extendable arm(s) 114, having, for example, mutually swiveling arm portions 114A, 114B. However, this particular configuration is not intended to be limiting; in other examples, mounting system 100 can include more, fewer, or different components. For instance, in other examples, mounting system 100 may not include extendable arm(s) 114, and instead, mounting device 106 may be rigidly coupled directly to wall-mounting bracket 108.

Wall-mounting bracket 108 enables mounting device 106 to be removably coupled to wall 104. For instance, wall-mounting bracket 108 can include one or more slots (not shown) for screwing or nailing wall-mounting bracket 108 to wall 104. Wall-mounting bracket 108 further includes a coupling mechanism for removably coupling to proximal extendable-arm portion 114A. In one non-limiting example, wall-mounting bracket 108 can include a vertical peg 109 configured to insert into a corresponding lumen of proximal extendable-arm portion 114A, such that proximal extendable-arm portion 114A can pivot about a vertical axis defined by the peg 109.

As detailed further below, mounting device 106 includes display-mounting bracket 110 configured to removably couple to a proximal side (e.g., backside) of electronic display 102. For instance, display-mounting bracket 110 can include one or more slots (not shown) for screwing display-mounting bracket 110 to a backside of display 102. Extendable arm(s) 114 enable a user to extend display 102 distally away from wall 104, e.g., along a direction parallel to the "X" axis indicated in FIGS. 1A and 1B. In some examples (not shown), extendable arm(s) 114 can include a pair of opposing arms (each having a respective proximal portion and a distal portion) configured to mutually collapse proximally toward wall 104 to position electronic display 102 in a "flat" configuration.

In accordance with techniques of this disclosure, mounting device 106 defines a vertical-tilt mechanism 112, e.g., an integrated spring-based counterbalancing mechanism configured to retain display 102 at a desired vertical-tilt orientation in the absence of additional external forces applied to display 102. That is, when display 102 is coupled to mounting device 106 (via display-mounting bracket 110), both display 102 and display-mounting bracket 110 are configured to vertically pivot or "tilt" about a vertical-tilt axis, passing through pivot point 138. Although not visible from the perspective shown, the vertical-tilt axis is a horizontal axis (e.g., parallel to the "Y" axis) indicated by pivot point 138. Electronic display 102 pivots about this axis in order to adjust a desired viewing orientation of viewing screen 116 of display 102 (e.g., relative to the planar surface of wall 104).

As detailed further below, tilt mechanism 112 includes at least a proximal extension 146 of display-mounting bracket 110, a main fixing plate 126, and a tension spring 120 extending between the two components. Display-mounting bracket 110 and main fixing plate 126 of tilt mechanism 112 are also pivotably connected by an axle, such as elongated pivot screw(s)), extending through pivot point 138, which functions as a rotating shaft. In some examples, the pivot screw(s) can be configured to further adjust the locking friction between display-mounting bracket 110 and main fixing plate 126.

As shown in FIGS. 1A and 1B, vertical-tilt mechanism 112 further includes a user-input mechanism 118 (also referred to herein as "adjustment knob 118") that enables a user to either increase or decrease, as desired, a "dampening force" associated with tilt mechanism 112. As used herein, the "dampening force" refers to a minimum amount of applied force required for the user to adjust the vertical-tilt orientation of display 102, e.g., from a first vertical-tilt orientation to a second vertical-tilt orientation. In other words, manipulation of user-input mechanism 118 modifies a coefficient of static friction used to retain display 102 in a current vertical-tilt orientation. In this way, mounting device 106 is capable of accommodating a broad spectrum of differently weighted electronic displays without overwhelming the vertical-tilt mechanism.

In particular, and as detailed further below, user-input mechanism 118 is configured to modify the dampening force of tilt mechanism 112 by any or all of: (1) altering an effective length of tension spring 120 (e.g., as measured along a longitudinal axis "A" of the spring 120); (2) altering an orientation of tension spring 120 (e.g., of longitudinal axis "A") relative to the vertical "Z" axis; or (3) altering both the effective length and the orientation of counterbalancing spring 120.

Figure 2:
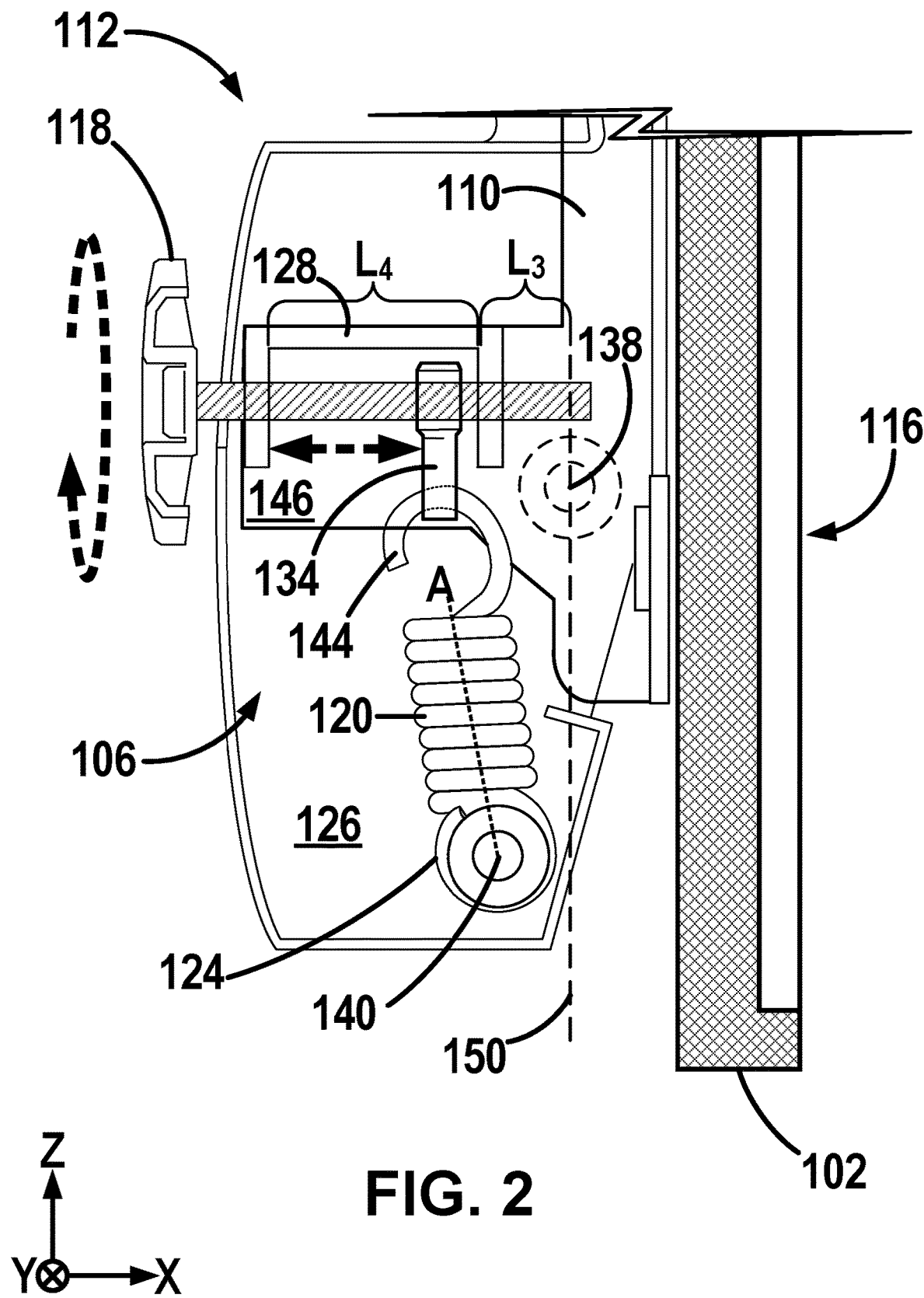
FIG. 2 is a cross-sectional side view of the vertical-tilt mechanism of FIGS. 1A and 1B.

FIG. 2 is a cross-sectional side view of vertical-tilt mechanism 112 of mounting device 106 of FIGS. 1A and 1B. Vertical-tilt mechanism 112 includes at least a proximal extension 146 of display-mounting bracket 110, a main fixing plate 126, and a tension spring 120 (also referred-to herein as "counterbalancing spring 120") extending between main fixing plate 126 and display-mounting bracket 110.

Tension spring 120 can include virtually any suitable elastic (e.g., compression-and-expansion) mechanism, including, but not limited to: gas spring(s), compression spring(s), torsion spring(s), a stretchable fabric material, or rubber cord(s). As one particular illustrative, non-limiting example, spring 120 can be formed from carbon steel, such as 65 manganese (65Mn) carbon steel. A first, lower end of tension spring 120 includes a lower spring bushing 124, and a second, upper end of spring 120 defines a hook 144.

Lower spring bushing 124 of tension spring 120 is pivotably fixed to an anchor point 140 on one side of main fixing plate 126, such that spring bushing 124 can rotate about a horizontal axis (e.g., parallel to the "Y" axis) passing through anchor point 140. Hook 144 of spring 120 is hung through a first lumen defined by a lower portion of damper slider 134. Adjustment screw 130 engages with a second, threaded lumen defined by an upper portion of damper slider 134.

During an initial installation and setup process of mounting system 100, a user can actuate a user-input mechanism, such as by rotating a damper-adjustment knob 118, to adjust a proximal-to-distal position of damper slider 134 to move forward and backward (e.g., along the X-axis direction, from the perspective of FIG. 2) within the space defined by length "$L_4$." As upper hook 144 of spring 120 is coupled to damper slider 134, the proximal/distal translation of damper slider 134 modifies an angle of tension spring 120 (e.g., of central longitudinal spring axis "A)" relative to vertical axis 150 of tilt mechanism 112 (e.g., relative to the "Y" axis), thereby modifying a tension force within spring 120 that is used to dynamically counterbalance a weight of electronic display 102.

As one illustrative example of the functionality of vertical-tilt mechanism 112, for a relatively heavier electronic display 102, the user can rotate adjustment knob 118 in a counter-clockwise direction to move damper slider 134 proximally, thereby increasing the angle between spring axis "A" and vertical axis 150, and also incrementally lengthening (e.g., stretching) spring 120 to provide a greater counterbalancing force. By contrast, for a relatively lighter electronic display 102, the user can rotate adjustment knob 118 in a clockwise direction to move damper slider 134 distally, thereby decreasing the angle between spring axis "A" and vertical axis 150, and also incrementally shortening (e.g., compressing) spring 120 to provide a lesser counterbalancing force.

Figure 3:
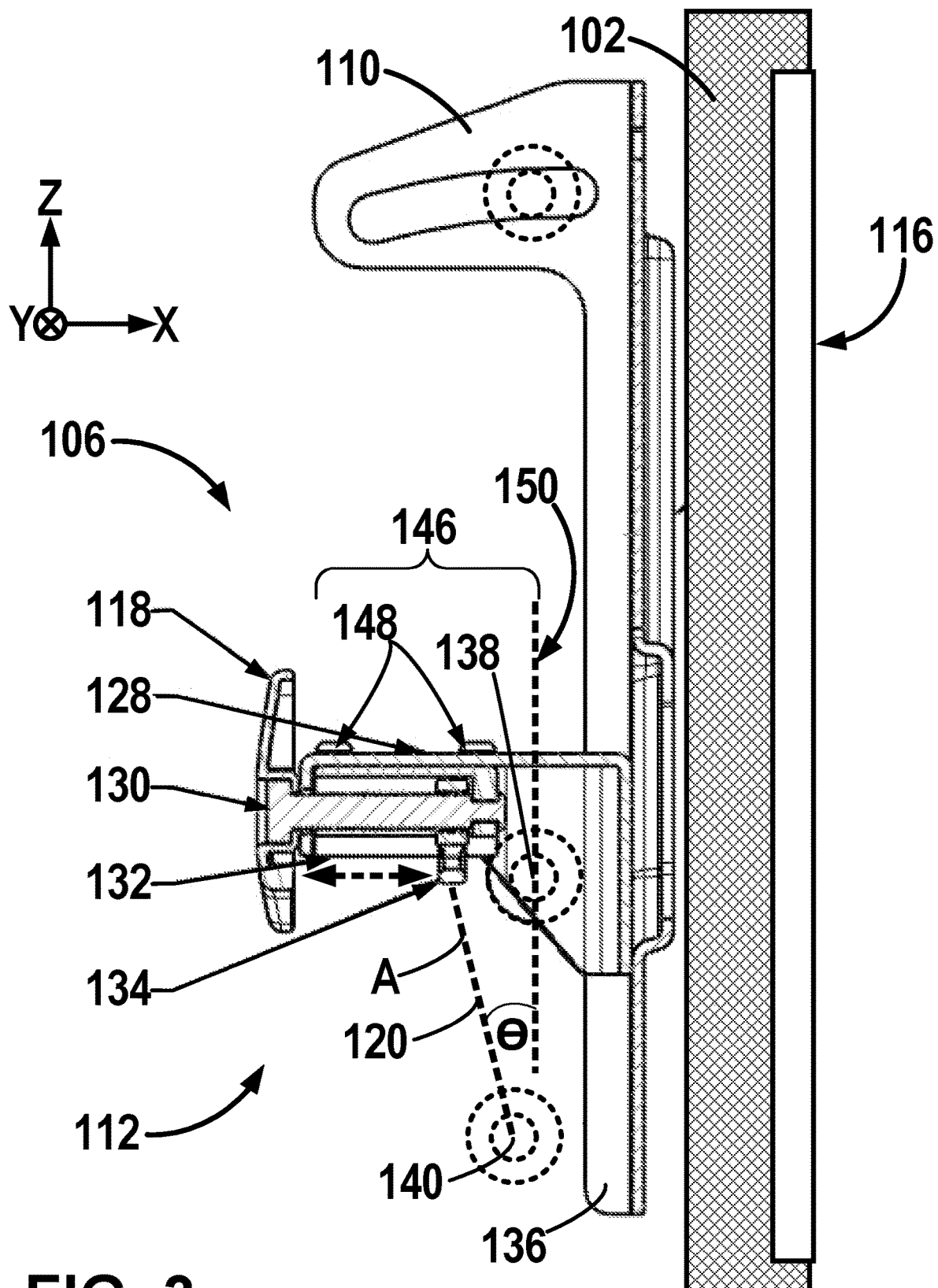
FIG. 3 is a cross-sectional side view of a display-mounting bracket of the mounting device of FIG. 1A coupled to an electronic display.

FIG. 3 is a cross-sectional side view of display-mounting bracket 110 of mounting device 106 of FIGS. 1A and 1B, at least a portion of which is incorporated within vertical-tilt mechanism 112. In particular, display-mounting bracket 110 includes a proximal extension 146, which extends proximally (e.g., along the negative-X-axis direction) past pivot point 138.

In the particular example shown in FIG. 3, proximal extension 146 of display-mounting bracket 110 includes user input 118 (also referred-to herein as "damper-adjustment knob 118"), damper box 128, damper-adjustment screw 130, upper and lower damper covers 132, damper slider 134, and angle-adjustment plate 136.

In some examples, but not all examples, damper box 128 and angle-adjustment plate 136 can be welded together. In other examples, damper box 128 and angle-adjustment plate 136 can be integrally formed as a coherent unit. Upper and lower damper covers 132 are assembled within damper box 128. Upper and lower damper covers 132 are configured to house and retain damper slider 134 and a distal portion of damper-adjustment screw 130. That is, damper slider 134 is coupled to, and movable relative to, upper and lower damper covers 132 via damper-adjustment screw 130, which is configured to extend distally through proximal openings in damper box 128 and damper covers 132. Upper and lower damper covers 132 are coupled to the damper box 128 and retained by screws 148.

As shown in FIG. 3, in response to user-rotation of knob 118 and screw 130, damper slider 134 is configured to "slide" (e.g., translate) along the X-axis direction (e.g., left-and-right, from the perspective shown in FIG. 3) within damper box 128 to modify an angle "θ" between vertical axis 150 of vertical-tilt mechanism 112, and a central longitudinal axis "A" of tension spring 120, thereby changing a tension force applied to spring 120.

FIG. 4A is a transparent side view of vertical-tilt mechanism 112 of FIGS. 1A and 1B; FIG. 4B is a transparent side view of main fixing plate 126 of vertical-tilt mechanism 112 of FIG. 4A; and FIG. 4C is a transparent side view of display-mounting bracket 110 of vertical-tilt mechanism 112 of FIG. 4A. As shown in FIGS. 4A-4C, display-mounting bracket 110, including proximal extension 146, is configured to vertically tilt relative to main fixing plate 126, about a horizontal axis passing through pivot point 138. In some examples, but not all examples, an upper portion of display-mounting bracket 110 defines a curved slot 152 that conforms to the rotational arc of display-mounting bracket 110. Curved slot 152 is configured to receive and retain a tilting screw 154 that also extends through a screw bore 156 defined by an upper portion of main fixing plate 126. In this way, tilting screw 154 guides and controls a tilting rotation of display-mounting bracket 110 as it moves through curved slot 152. Additionally, screw 154 can be adjusted to apply additional (or less) friction force to further control the tilting motion of display-mounting bracket 110. Additional or alternative sources of static friction can be incorporated, e.g., via magnets.

As further shown in FIGS. 4A and 4C, proximal extension 146 of display-mounting bracket 110 can include a tension-force indicator 142. During an initial installation and setup process, a user can rotate damper-adjustment knob 118 to move damper slider 134 until indicator 142, which is rigidly coupled to damper slider 134, is aligned with a relative-force value corresponding to an approximate weight of electronic display 102. At this position of damper slider 134 (and accordingly, at this orientation of tension spring 120), tension spring 120 is imbued with sufficient tension force to dynamically counterbalance the weight of electronic display 102 according to any desired vertical-tilt orientation.

Figure 5A:
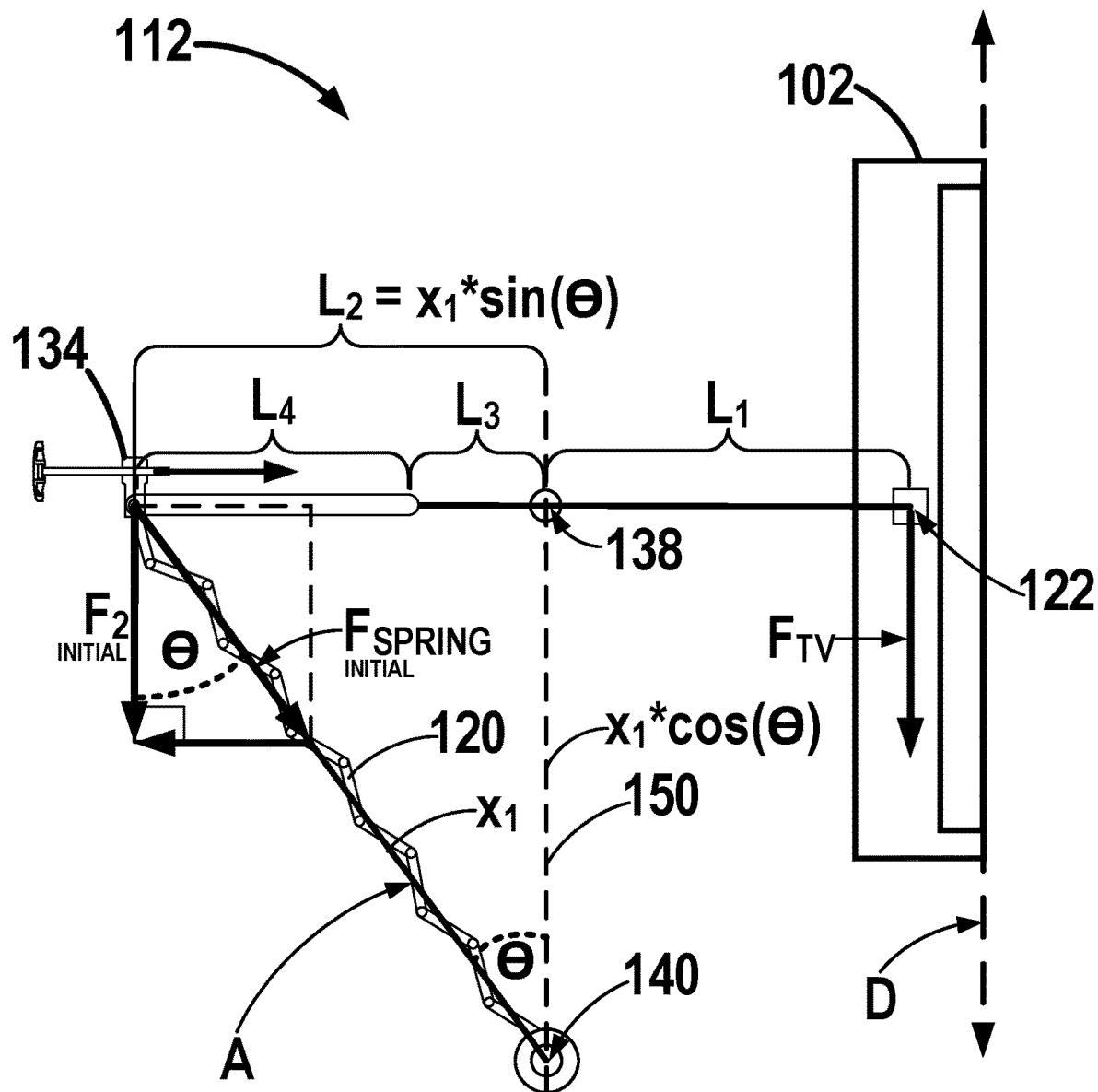
FIG. 5A is a conceptual free-body diagram illustrating a spring-based vertical-tilt counterbalancing mechanism for a wall-mounted electronic display.
Figure 5B:
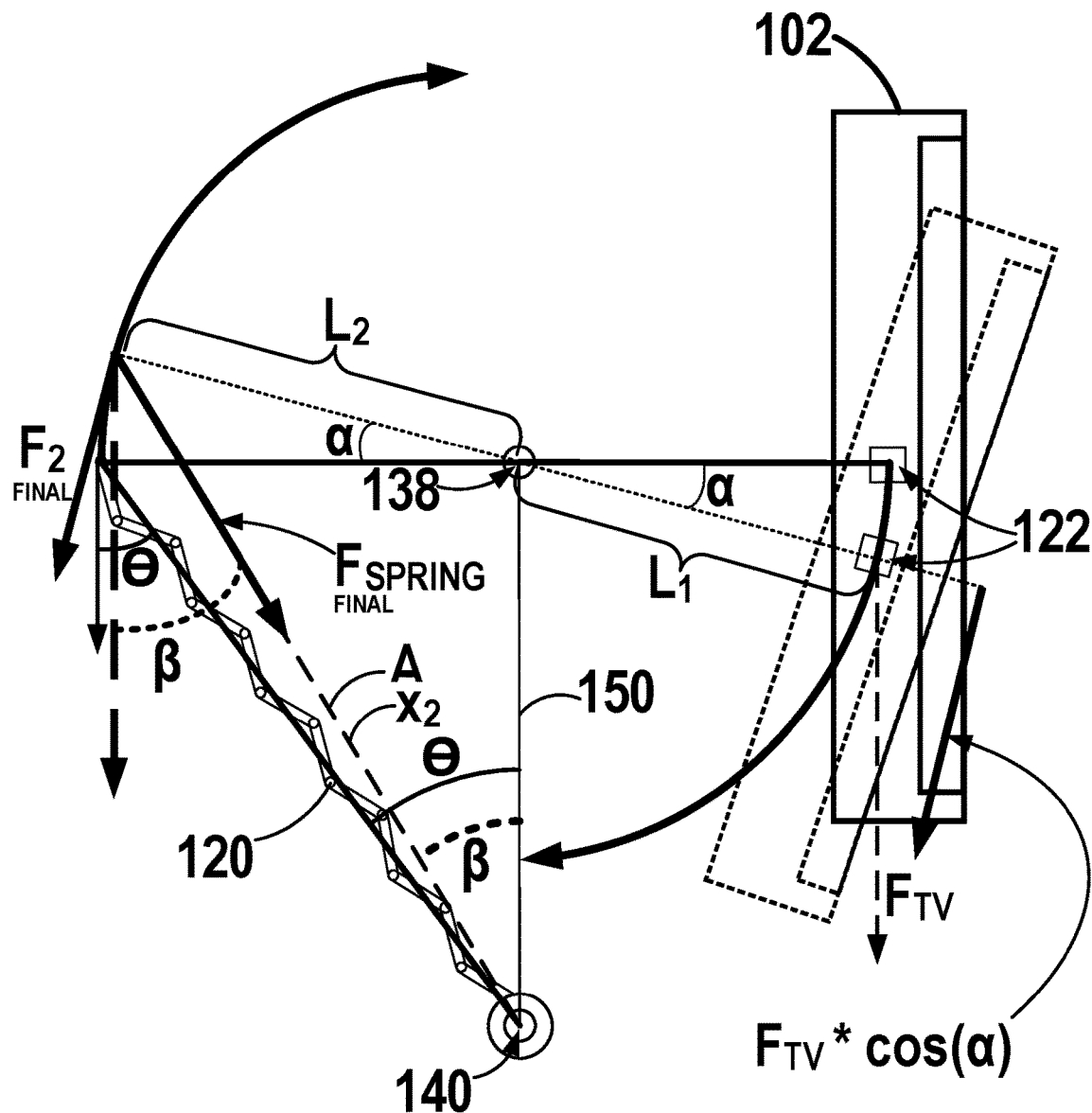
FIG. 5B is a conceptual free-body diagram illustrating the spring-based vertical-tilt counterbalancing mechanism when the electronic display is vertically tilted by an angle "a."

FIGS. 5A and 5B are conceptual, free-body diagrams illustrating a spring-based counterbalancing technique for a vertical-tilt adjustment of a wall-mounted electronic display 102. The free-body diagrams of FIGS. 5A and 5B are not drawn to scale, in order to facilitate explanation of the techniques and mechanisms thereof.

As shown in FIGS. 5A and 5B, spring-based vertical-tilt mechanism 112 implements principles of physics associated with an ideal lever (e.g., conceptually similar to a set of weighing scales, or a see-saw), centered around pivot point 138. In other words, a "proximal" torque (on the left-hand side of pivot point 138) is configured to balance a "distal" torque (on the right-hand side of pivot point 138), wherein the standard torque equation=APPLIED FORCE×DISTANCE TO FULCRUM×SINE(ANGLE BETWEEN FORCE AND LEVER).

For instance, FIG. 5A illustrates vertical-tilt mechanism 112 while counterbalancing a weight "$F_{TV}$" of electronic display 102. For ease of understanding, the weight "$F_{TV}$" is conceptually simplified in FIGS. 5A and 5B as a point-mass located at the center-of-mass 122 of display 102. In the example of FIG. 5A, display 102 is counterbalanced according to a first vertical-tilt orientation, in which a vertical axis "D" of electronic display 102 is substantially aligned with the vertical "Y" axis (e.g., with a direction of gravity, and with a planar surface of wall 104 of FIGS. 1A and 1B). That is, the gravitational weight "$F_{TV}$" of display 102 is counterbalanced opposite pivot point 138 by a vertical component of tension force "$F_{SPRING}$" of spring 120. Therefore, according to basic principles, for a spring 120 having a spring constant k:

$$[F_2 * L_2 * \sin(90°)] = [F_{TV} * L_1 * \sin(90°)]$$
$$[F_2 * L_2] = [F_{TV} * L_1]$$
$$[F_2 * L_2] = F_{SPRING}(\cos(\theta)) * (L_2) =$$
$$k * x_1 * L_2 * \cos(\theta) = k * x_1 * x_1 * \sin(\theta) * \cos(\theta) = k * x_1^2 * \sin(\theta) \cos(\theta)$$

As indicated in FIG. 5A, damper slider 134 can be translated proximally and distally (e.g., along the X-axis) to lengthen or shorten length $L_4$ (and accordingly, shorten length $L_2$), thereby modifying both of: (1) the angle "θ" between spring axis "A" and vertical axis 150, and (2) the effective length of tension spring 120 along spring axis "A." At a certain horizontal position of damper slider 134, vertical-tilt mechanism 112 achieves a tension force $F_{SPRING}$ sufficient to counterbalance the weight $F_{TV}$ of electronic display 102.

As shown in FIG. 5B, a user may wish to re-orient the vertical-tilt orientation of electronic display 102 by a vertical-tilt angle "α." In some such examples, electronic display 102 may be automatically counterbalanced by tension spring 120. That is, a user may need only to apply a minimum amount of external force to re-orient electronic display 102. For instance, as shown in FIG. 5B, tilting display 102 by angle "α" changes the spring orientation from the first, wider angle "Θ" to a second, narrower angle "β." However, spring 120 is also stretched to a longer effective length at the new tilt orientation, thereby increasing the tension force $F_{SPRING}$ of spring 120. Specifically, spring 120 can define an initial tension force $F_{SPRING\ (INITIAL)}=k*x_1$, where "k" is the spring constant inherent to spring 120, and "$x_1$" is the initial effective length of spring 120. Spring 120 can then define a final tension force $F_{SPRING\ (FINAL)}=k*x_2$, where $x_2=[x_1*\cos(\Theta)+L_2*\sin(\alpha)]/\cos(\beta)$.

The resulting change in effective length of tension spring 102 from the change in tilt orientation of electronic display 102 may inherently be approximately equal and opposite to the change in the lever-moment (e.g., weight "$F_{TV}$" times distance "$L_1$") on the distal (e.g., right-hand) side of pivot point 138. In other cases, the user can adjust knob 118 to compensate for the change in tension force $F_{SPRING}$, and therefore the change in proximal (left-hand) lever-moment, resulting from the change in orientation to angle "β."

If the lever-moments (e.g., torques) on both sides of pivot point 138 are equal, then display 102 will be in a balanced, equilibrium state:

Proximal (left) side of pivot point 138: $\text{Torque}_{PROXIMAL} =$
$$F_{2(FINAL)} * L_2 = F_{SPRING\ (INITIAL)} * \cos(\theta) * \cos(\alpha) * L_2$$

Distal (right) side of pivot point 138: $\text{Torque}_{DISTAL} = F_{TV} * L_1 * \cos(\alpha)$ Lever balance: $(F*L)_{FINAL-PROXIMAL} = (F*L)_{FINAL-DISTAL}$ $$F_{SPRING\ (INITIAL)} * \cos(\theta) * \cos(\alpha) * L_2 = F_{TV} * L_1 * \cos(\alpha)$$

$$F_{SPRING\ (INITIAL)} * \cos(\theta) * L_2 = F_{TV} * L_1$$

If the "lever" of tilt mechanism 112 is not balanced according to this equation, the user can further adjust damper slider 134, and/or increase the friction in pivot point 138, e.g., by adjusting the pivot screw(s), or screw 154 (FIGS. 4A and 4C). For instance, to increase the overall sense of "damping" (e.g., minimum applied force to tilt the display 102), the user can adjust the tension of the screw at the point of rotation 138 to increase frictional damping, enabling the user to more-easily adjust the vertical-tilt angle "α" of display 102.

Figure 6:
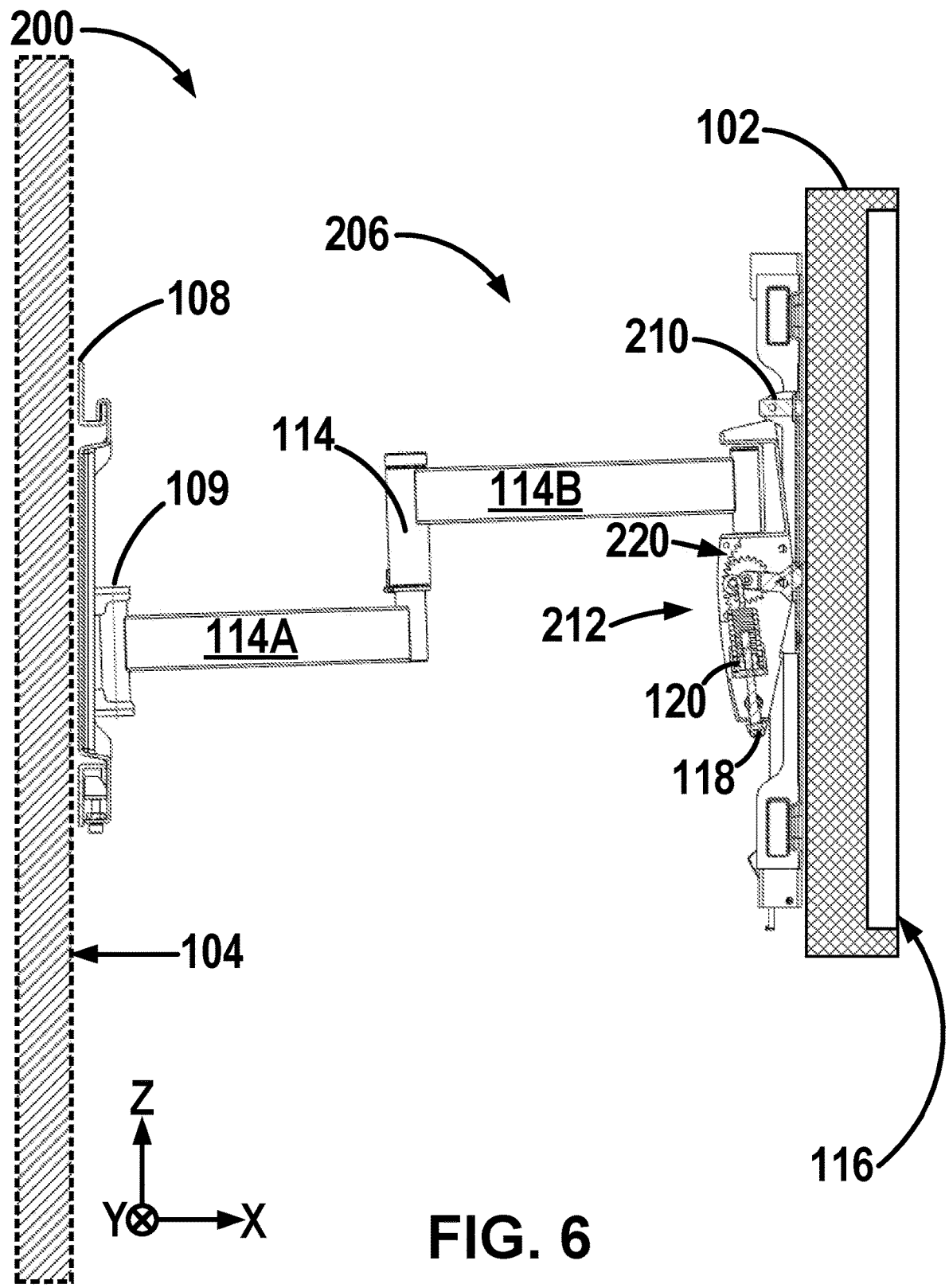
FIG. 6 is a side view of another example wall-mounting system for an electronic display, including a mounting device with a spring-balanced vertical-tilt mechanism.

FIG. 6 is a side view of another example wall-mounting system 200 for an electronic display 102, including a mounting device 206 with a vertical-tilt mechanism 212. Wall-mounting system 200 of FIG. 6 is an example of wall-mounting system 100 of FIGS. 1A and 1B, apart from any differences explicitly noted herein. For instance, wall-mounting system 200 includes mounting device 206. Mounting device 206 is an example of mounting device 106 of FIGS. 1A and 1B, apart from any differences explicitly noted herein. For instance, mounting device 206 includes vertical-tilt mechanism 212, which is an example of vertical-tilt mechanism 112 of FIGS. 1A and 1B, apart from any differences explicitly noted herein. In particular, vertical-tilt mechanism 212 includes a planetary-gear system 220 configured to convert rotational motion of adjustment knob 118 into a vertical-tilting motion of display-mounting bracket 110 and electronic display 102.

Figure 7A:
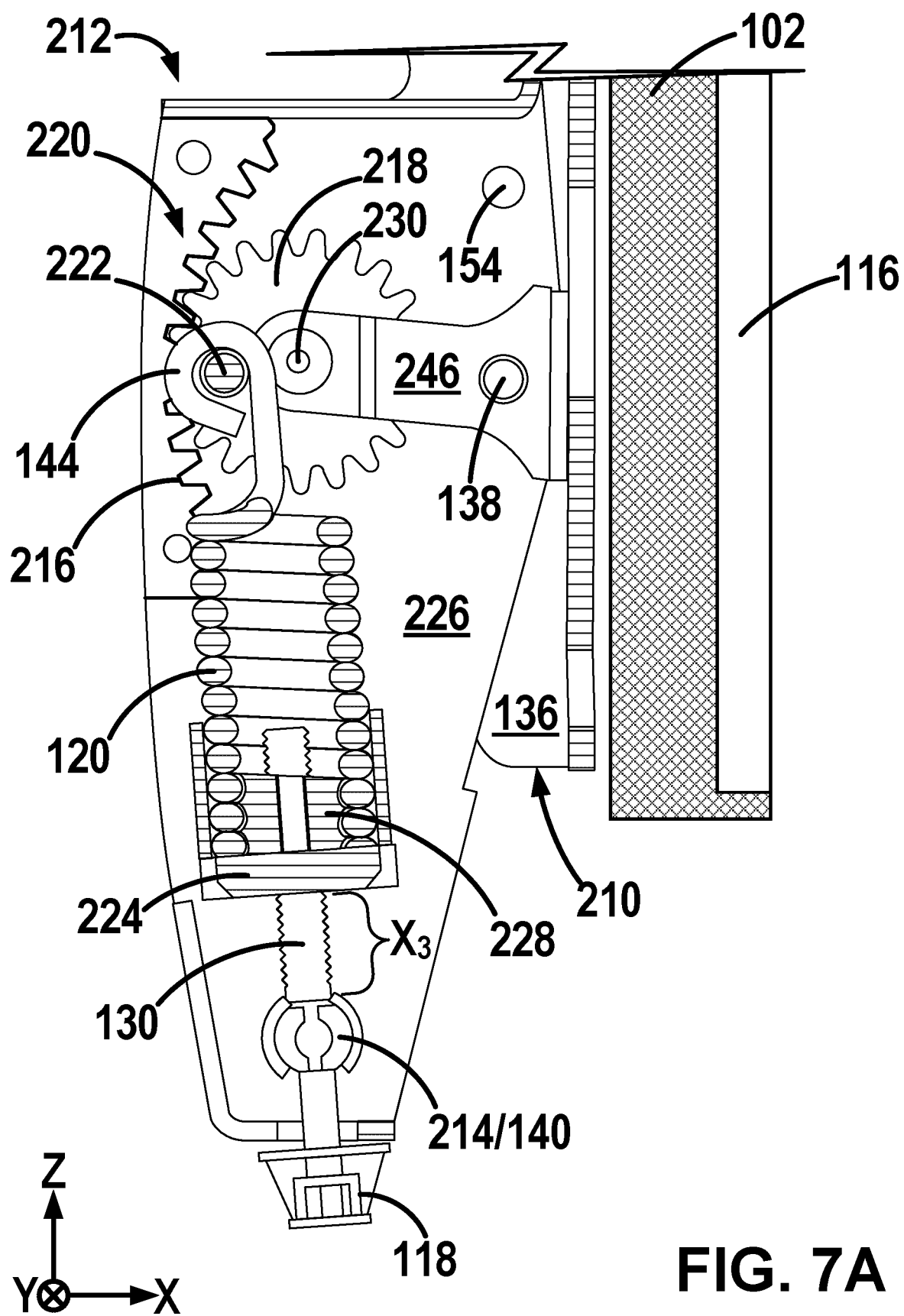
FIG. 7A is a cross-sectional side view of the vertical-tilt mechanism of FIG. 6.
Figure 7B:
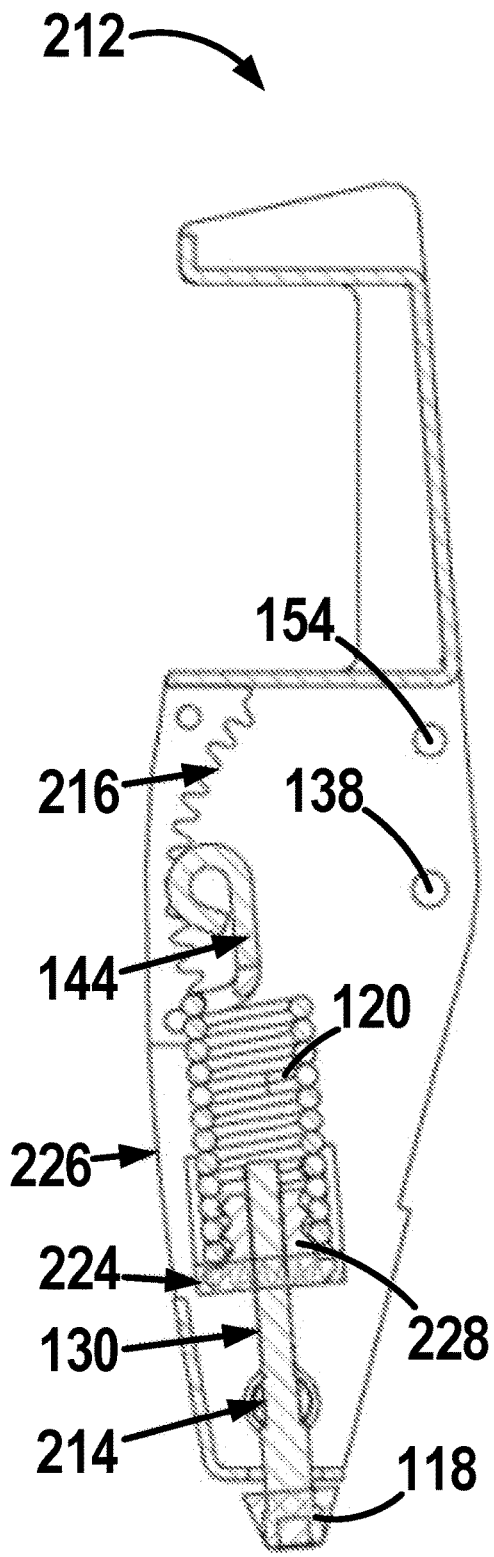
FIG. 7B is a transparent side view of a main fixing plate of the vertical-tilt mechanism of FIG. 7A.
Figure 7C:
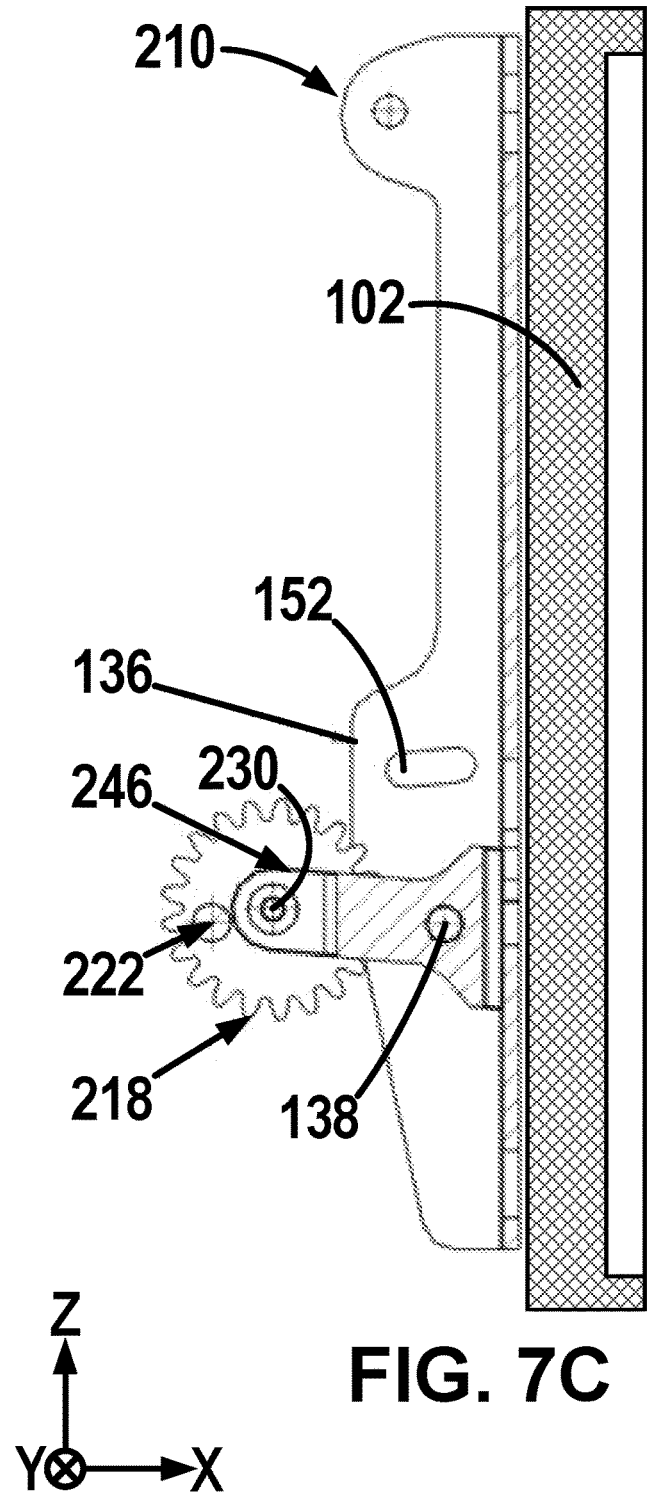
FIG. 7C is a transparent side view of a display-mounting bracket of the vertical-tilt mechanism of FIG. 7A.

FIG. 7A is a cross-sectional side view of the vertical-tilt mechanism 212 of FIG. 6, FIG. 7B is a transparent side view of a main fixing plate 226 of the vertical-tilt mechanism 212 of FIG. 7A, and FIG. 7C is a transparent side view of a display-mounting bracket 210 of the vertical-tilt mechanism of FIG. 7A. Main fixing plate 226 is an example of main fixing plate 126 of FIGS. 2, 4A, and 4B; and display-mounting bracket 210 is an example of display mounting bracket 110 of FIGS. 2, 4A, and 4C, apart from any differences noted herein. As shown particularly in FIG. 7A, display-mounting bracket 210 and main fixing plate 226 are rotatably coupled, e.g., via a screw connection, at the center of rotation 138 of display-mounting bracket 210. In some examples (but not all examples), adjustment of the screw through pivot point 138 provides additional (or less) frictional damping, as needed, to further help control the vertical tilt of display 102.

As shown particularly in FIG. 7B, main fixing plate 226 (e.g., the rotationally "fixed" component of vertical-tilt mechanism 212) includes: tension spring 120, spring-adjustment screw 130, fixed spring-rotation shaft 214, inner gear ring 216, and fixed spring seat 224. In some examples (but not all examples), main fixing plate 226 and inner gear ring 216 can be rigidly coupled (e.g., welded) from two (e.g., initially separate) components into an integral unit. In other examples, main fixing plate 226 and inner gear ring 216 can be formed (e.g., machined or laser-cut) from a coherent unit of material, such that inner gear ring 216 is considered to be a portion of main fixing plate 226. Similarly, tension spring 120 and fixed spring seat 224 can be either rigidly coupled or coherently formed as a whole unit.

Spring-adjustment screw 130 is rotatably (e.g., pivotably) coupled to fixed spring-rotation shaft 214, which, in some examples, can be coupled (e.g., via screws) to main fixing plate 126. Fixed spring-rotation shaft 214 functions as both an anchor point (e.g., anchor point 140) for tension spring 130, as well as a pivot point for spring-adjustment screw 130. Additionally, spring-adjustment screw 130 locks into the spring fixing-seat 224. Spring fixing seat 224 includes a central screw sleeve 228. Spring fixing seat 224 is fixed to (e.g., embedded in) tension spring 120, and adjusting screw 130 acts on (e.g., "screws through") screw sleeve 228 within spring 120.

As shown particularly in FIG. 7C, display-mounting bracket 210 includes angle-adjusting plate 136, planetary gear 218, locking-gear shaft 222, and proximal extension 246 (also referred to herein as "rotating lever 246"). Proximal extension 246 is an example of proximal extension 146 of FIGS. 2, 3, and 4C.

In some examples (but not all examples), angle-adjusting plate 136 and proximal extension 246 can be rigidly coupled (e.g., welded) from two initially separate components into an integral unit. In other examples, angle-adjusting plate 136 and proximal extension 246 can be formed (e.g., machined or laser-cut) from a coherent unit of material.

Planetary gear 218 is rotatably coupled to a proximal end of proximal extension 246. Similarly, locking-gear shaft 222 is rotatably coupled to planetary gear 218, offset from the axis of rotation of planetary gear 218.

Gear teeth of planetary gear 218 are interlaced with corresponding teeth of inner gear ring 216, and upper hook 144 of tension spring 120 is hung on the locking-gear shaft 222 to rotatably couple display-mounting bracket 210 to main fixing plate 226. Planetary gear 218 of display-mounting bracket 110 is then configured to toothedly rotate within inner gear ring 216 of main fixing plate 126.

Tension spring 120 can include any suitable type of spring, including a gas spring, a compression spring, a torsion spring, or the like. Tension spring 120 is configured to provide a tension force to achieve dynamic balance against the weight of electronic display 102 (e.g., opposite pivot point 138). That is, tension spring 120, via rotational motion of planetary gear 218, is configured to automatically stretch to an effective length corresponding to an internal spring-tension force equivalent to the weight of electronic display 102.

When electronic display 102 is coupled to display-mounting bracket 110, the user can rotate spring-adjustment knob 118 to rotate adjustment screw 130, and thereby modify the tension force of tension spring 120. In particular, the user can adjust the tension force of tension spring 120 so as to counterbalance the weight of electronic display 102 while adjusting a vertical-tilt angle of display-mounting bracket 110 and electronic display 102.

Planetary gear 218 is designed as an "eccentric," commonly defined as "a circular disk (gear 218) fixed to a rotating axle (locking gear shaft 222) with its center (rotation axis 230) offset from that of the axle (shaft 222)." Accordingly, locking gear shaft 222 of planetary gear 218 defines an "eccentric position" of electronic display 102, and an eccentric distance of tilt mechanism 212. As used herein, the "eccentric distance" is defined as the distance corresponding to vertical-tilt adjustment of display-mounting bracket 110 by a predetermined rotation angle "α." For instance, tilt mechanism 212 can be configured to tilt within a range defined by the eccentric distance, such as "upward" by about 5 degrees and "downward" by about 15 degrees, for a total rotational range of about 20 degrees.

Tension spring 120 compensates for rotation of planetary gear 218 by lengthening or shortening, and conversely, planetary gear 218 compensates for lengthening or shortening of tension spring 120 by rotating relative to inner gear ring 216. In either case, as the spring hook 144 and locking gear shaft 222 rotate relative to the center of rotation of planetary gear 218, adjustment screw 130 is configured to pivot about fixed rotation shaft 214 to compensate.

Figure 8A:
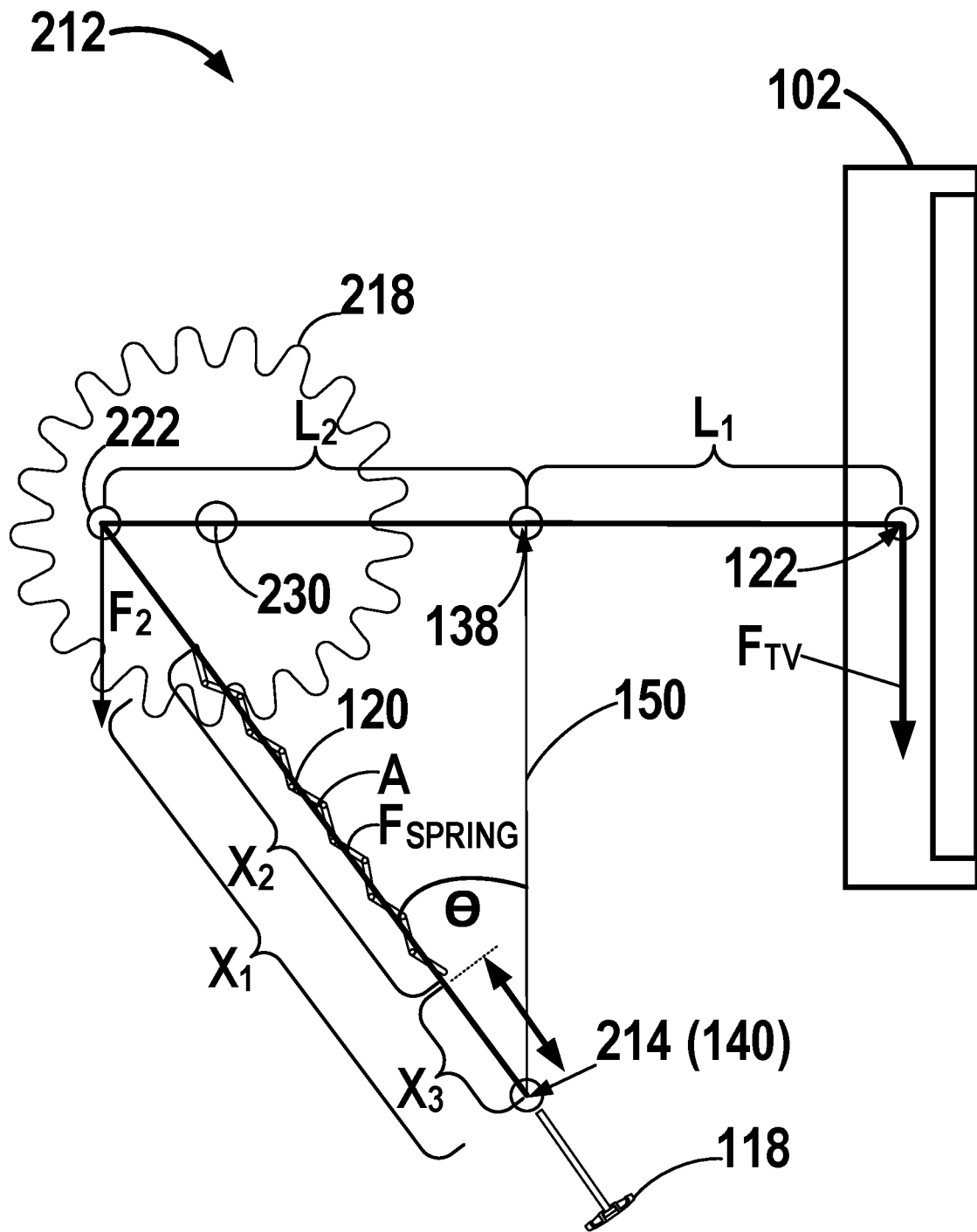
FIG. 8A is a conceptual free-body diagram illustrating a spring-based vertical-tilt counterbalancing mechanism for a wall-mounted electronic display.
Figure 8B:
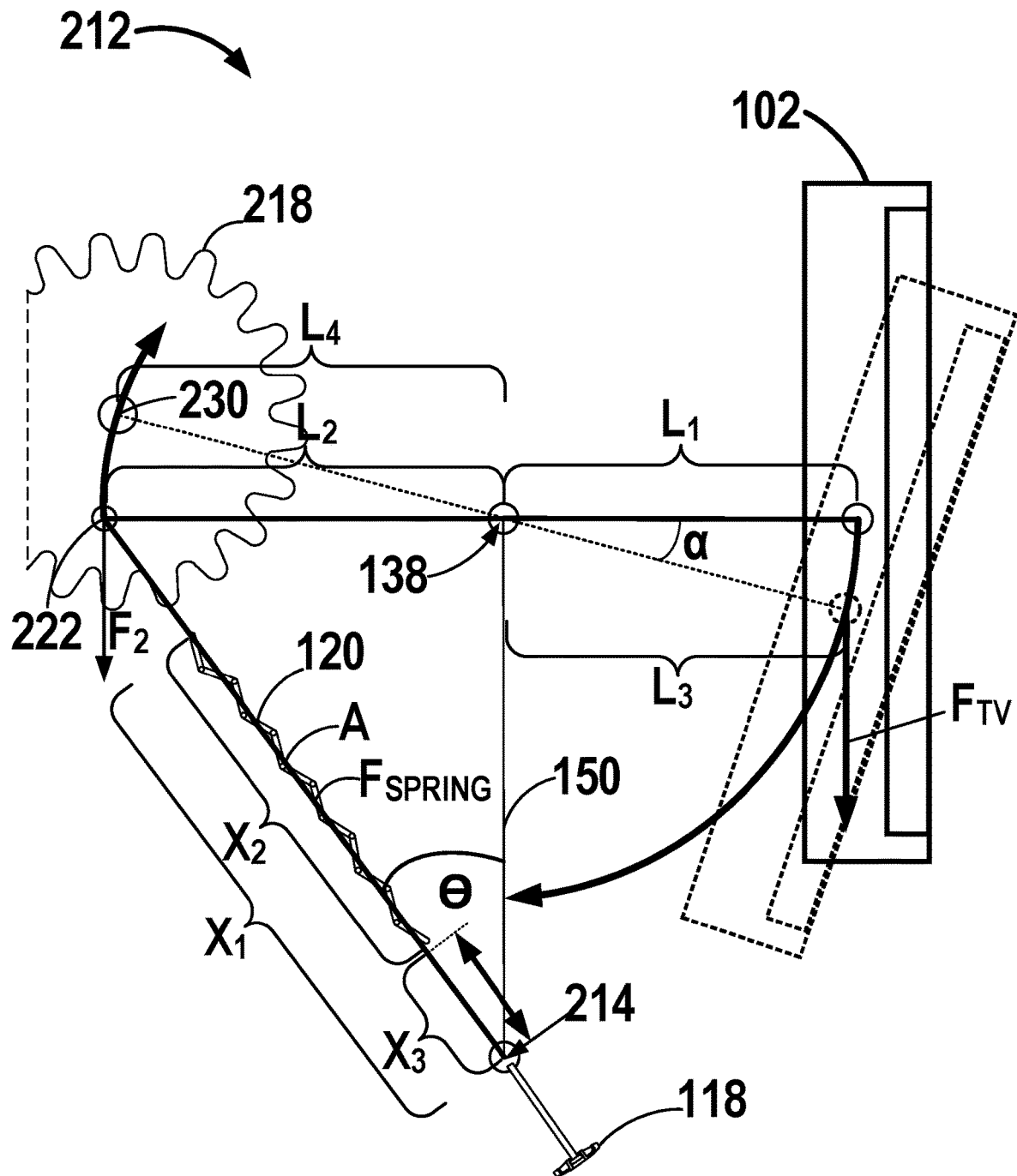
FIG. 8B is a conceptual free-body diagram illustrating the spring-based vertical-tilt counterbalancing mechanism of FIG. 8A when the electronic display is vertically tilted by an angle "α."

FIG. 8A is a conceptual diagram illustrating a spring-based vertical-tilt counterbalancing mechanism 212 of FIGS. 6-7C. It is to be understood that FIGS. 8A and 8B are not drawn to scale. Vertical-tilt mechanism 212 may be conceptualized as an ideal lever, similar to a see-saw or a set of weighing scales. As shown in FIG. 8A, the "right" side of pivot point 138 is the position where electronic display 102 is coupled to display-mounting bracket 110; the "left" side of pivot point 138 is understood as a lever used to balance display 102. Specifically, the left side includes an upper end of a tension spring 120, and below pivot point 138 is the lower end of tension spring 120 coupled to fixed spring-rotation shaft 214, which functions both as an anchor point 140, e.g., defining a fixed position of the lower end of spring 210, and a pivot point about which the lower end of spring 210 can rotate. Accordingly, the relevant lever-balance equation for tilt-mechanism 212 can be written as: $(F_{TV}*L_1 = F_2*L_2)$, wherein $F_2 = F_{SPRING}*\cos(\Theta)$.

To account for different weights of different electronic displays 102, the tension force $F_{SPRING}$ of spring 120 can be increased or decreased, as needed, by rotating knob 118 to lengthen or shorten length "$X_3$" (e.g., by translating adjustment screw 130 through spring seat 224) such that the tension force of spring 120 will retain electronic display 102 in a desired vertical-tilt orientation. It is also necessary to compensate for the length that spring 120 is stretched during vertical-tilt rotation of electronic display 102. Accordingly, vertical-tilt mechanism 212 includes planetary gear system 220 (FIG. 7A), with planetary gear 218 configured to rotate relative to an inner circumference of inner gear wheel 216 (FIG. 7B). For instance, in some examples, planetary gear 218 moves synchronously within inner gear ring 218 to compensate for vertical-tilt rotation of display 102, to maintain the overall motion balance of tilt mechanism 212, to maintain the effective length $X_1$ of spring 120, and accordingly, to maintain the tension force within spring 120.

As noted above, planetary gear 218 is designed as an "eccentric wheel," and the length of the eccentric position corresponds to a rotation of electronic display 102 by a predetermined angle "α," such as 20 degrees. For instance, FIG. 8B is a conceptual diagram illustrating vertical-tilt mechanism 212 when electronic display 102 is vertically tilted by angle "α."

The relevant lever-balance equations for tilt-mechanism 212 of FIG. 8B are:

Proximal (e.g., left side of pivot point 138) lever-moment:

$$F_{SPRING} = k * (X_2 + X_3) \text{ (where "}k\text{" is the elastic coefficient of spring 120)}$$

$$F_2 = F_{SPRING} * \cos(\theta) * (\cos(\alpha)$$

Leverage distance: $L_4 = L_2 * \cos(\alpha)$

Proximal lever–moment = $F_2 * L_4 =$ $$F_{SPRING} * \cos(\theta) * (\cos(\alpha) * L_4 = k * (X_2 + X_3) * L_2 * \cos(\theta) * \cos(\alpha)^2$$

Distal (e.g., right side of pivot point 138) lever-moment:

$$F_{TV} = \text{mass}_{TV} * \text{gravity}$$

Leverage distance: $L_3 = L_1 * \cos(\alpha)$

Distal lever moment = $F_{TV} * L_3 = m_{TV} * g * L_1 * \cos(\alpha)$

Lever-balance equation: $F_{TV}*L_3 = F_2*L_2$ $$k * (X_2 + X_3) * L_2 * \cos(\theta) * \cos(\alpha)^2 = mg * L_1 * \cos(\alpha)$$

$$k * (X_2 + X_3) * L_2 * \cos(\theta) * \cos(\alpha) = mg * L_1$$

Figure 9:
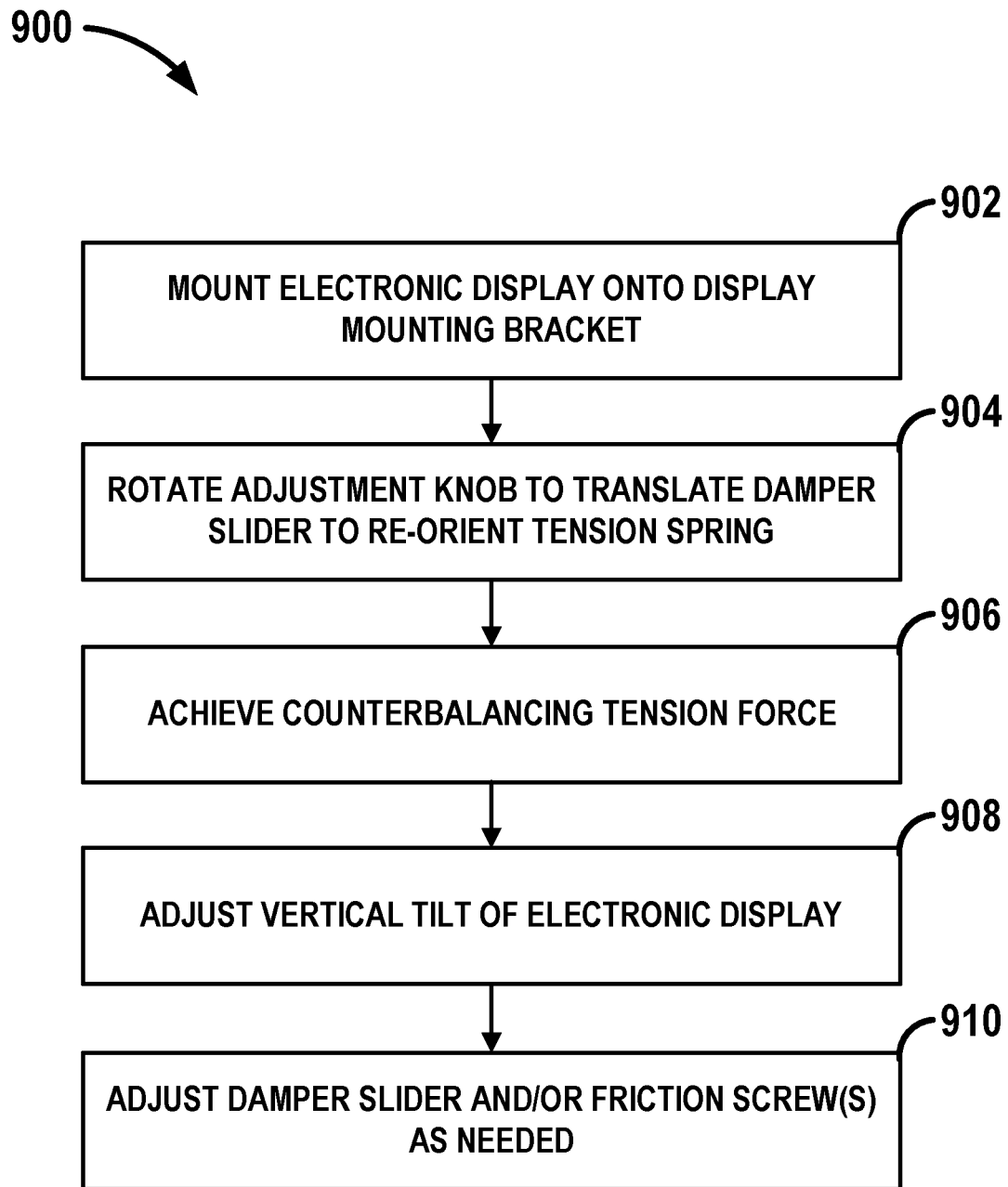
FIG. 9 is a flow diagram illustrating a first example spring-based counterbalancing technique for vertically tilting a wall-mounted electronic display.

FIG. 9 is a flow diagram illustrating a spring-based technique for adjusting a vertical-tilt angle of a wall-mounted electronic display 102. The technique of FIG. 9 is described with respect to mounting system 100 of FIGS. 1-5B, though any suitable mounting system may be implemented.

At step 902, a user mounts an electronic display 102, such as a flat-screen television, onto a display-mounting bracket 110 of a mounting device 106, which may or may not already be mounted onto a wall 104. At step 904, once the mounting system 100, including the electronic display 102, is fully mounted onto the wall 104, the user can rotate an adjustment knob 118 on a proximal side of a vertical-tilt mechanism 112. Rotation of the adjustment knob 118 causes proximal or distal translation of a damper slider 134 coupled to an upper end of a tension spring 120, thereby modifying an effective length and orientation angle of the tension spring 120. Accordingly, a tension force of the spring 120, used as a counterbalancing force for the electronic display 102, is adjusted.

At step 906, the user can continue to adjust the counterbalancing force until a "proximal" lever-moment of tilt mechanism 112 is equal to a "distal" lever-moment of tilt mechanism 112, that is, until the tension force of the spring 120 approximately balances the gravitational weight of the display 102, e.g., within a tolerance range provided by static friction. At step 908, the user can then manually adjust a vertical-tilt orientation (or "vertical-tilt angle") of electronic display 102, e.g., by applying pressure to electronic display 102 or an angle-adjustment plate 136 (FIG. 3) of display-mounting bracket 110. In some cases, after adjusting the vertical-tilt angle, the user may need to further adjust the damper slider 134 to re-balance tilt mechanism 112 (at step 910). Additionally or alternatively, the user can adjust one or more screws 138, 154, to dampen tilt mechanism 112 with additional static friction to help retain electronic display 102 in place.

Figure 10:
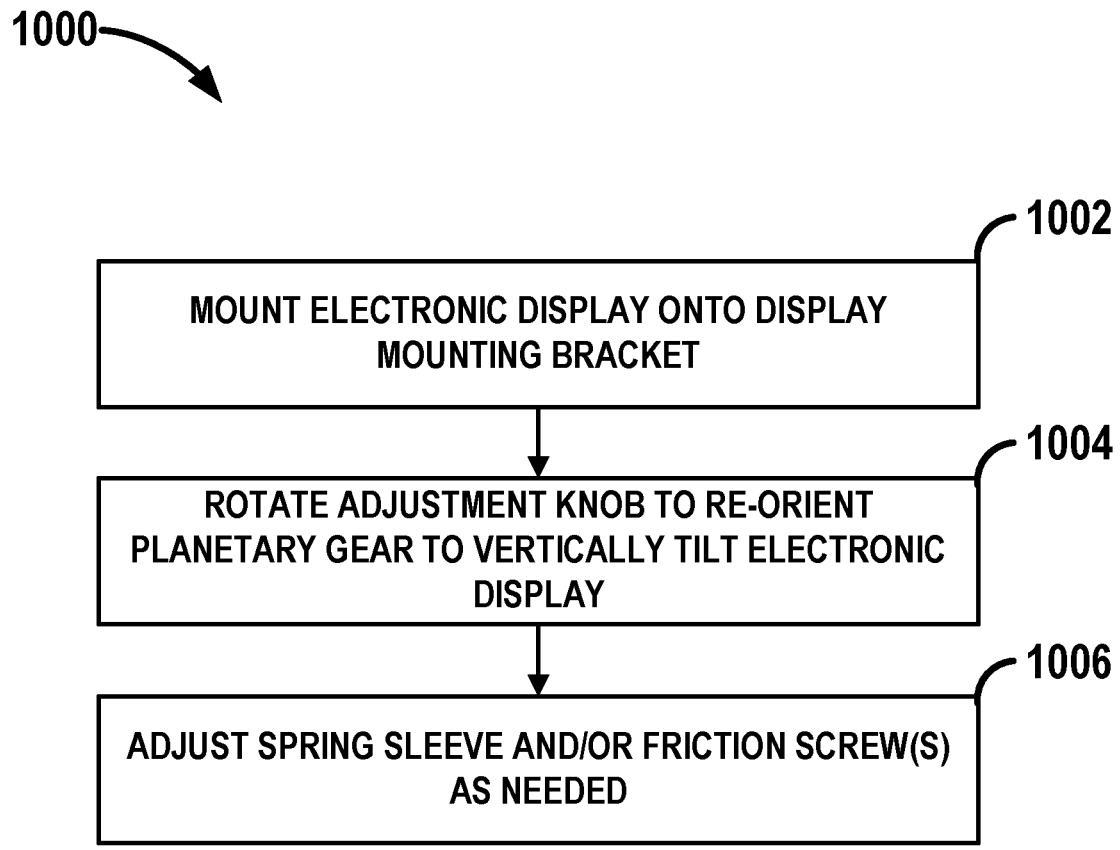
FIG. 10 is a flow diagram illustrating a second example spring-based counterbalancing technique for vertically tilting a wall-mounted electronic display.

FIG. 10 is a flow diagram illustrating a spring-based counterbalancing technique for vertically tilting a wall-mounted electronic display. The technique of FIG. 10 is described with respect to mounting system 200 of FIGS. 6-8B, though any suitable mounting system may be implemented.

At step 1002, a user mounts an electronic display 102, such as a flat-screen television, onto a display-mounting bracket 210 of a mounting device 206, which may or may not already be mounted onto a wall 104. At step 1004, once the mounting system 200, including the electronic display 102, is fully mounted onto the wall 104, the user can rotate an adjustment knob 118 on an underside of a vertical-tilt mechanism 212. Rotation of the adjustment knob 118 causes vertical translation of a fixed spring seat 224 coupled to a lower end of a tension spring 120, thereby modifying an effective length of the tension spring 120. Accordingly, a tension force of the spring 120, used as a counterbalancing force for the electronic display 102, is adjusted. This tension force is applied to a locking gear shaft 222 of an eccentric planetary gear 218, which incrementally rotates to vertically tilt electronic display 102. The user can continue to adjust the tension force until the desired tilt-orientation is achieved, and a "proximal" lever-moment of tilt mechanism 212 is equal to a "distal" lever-moment of tilt mechanism 212—that is, until the tension force of the spring 120 approximately balances the gravitational weight of the display 102, e.g., within a tolerance range provided by static friction. At step 1006, the user can adjust one or more screws 138, 154 (FIG. 7B), to dampen tilt mechanism 212 with additional static friction to help retain electronic display 102 in place.

It should be understood that the individual operations used in the techniques of these teachings may be performed in any suitable order and/or simultaneously, as long as the underlying technique remains operable. Furthermore, it should be understood that the present systems, devices, and techniques can include any number, or all, of the described examples, as long as the relevant functionality remains operable.

It should be appreciated that the various features of the described examples may be combined in various ways to produce numerous additional examples. Moreover, while various materials, dimensions, shapes, configurations and locations, etc. have been described for use with disclosed examples, others besides those disclosed may be utilized without exceeding the scope of the claimed inventions.

Persons of ordinary skill in the relevant arts will recognize that the subject matter hereof may comprise fewer features than illustrated in any individual example described above. The examples described herein are not meant to be an exhaustive presentation of the ways in which the various features of the subject matter hereof may be combined. Accordingly, the examples are not mutually exclusive combinations of features; rather, the various examples can include a combination of different individual features selected from different individual examples, as understood by persons of ordinary skill in the art. Moreover, elements described with respect to one example can be implemented in other examples even when not described in such embodiments unless otherwise noted.

Although a dependent claim may refer in the claims to a specific combination with one or more other claims, other examples can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A device comprising:
a main fixing plate configured to be coupled to a wall-mounting bracket, the main fixing plate comprising an inner gear wheel;
a display-mounting bracket configured to removably couple to a backside of an electronic display, wherein:
the display-mounting bracket is configured to vertically tilt, relative to the main fixing plate, about a tilt axis passing through a pivot point of both the display-mounting bracket and the main fixing plate,
the display-mounting bracket comprises a proximal extension extending proximally to the pivot point, and
the proximal extension comprises an eccentric gear comprising a locking shaft, the eccentric gear being configured to engage with the inner gear wheel of the main fixing plate;
a tension spring comprising a lower end coupled to the main fixing plate, and an upper end coupled to the locking shaft of the eccentric gear, such that the tension spring retains a vertical-tilt orientation of the display-mounting bracket relative to the main fixing plate; and
an adjustment screw coupled to the lower end of the tension spring, wherein rotation of the adjustment screw expands or compresses the tension spring.

2. The device of claim 1, wherein the upper end of the tension spring defines a hook configured to hang on the locking shaft of the eccentric gear.

3. The device of claim 1, wherein a bottom end of the adjustment screw comprises an adjustment knob.

4. The device of claim 1, wherein the lower end of the tension spring is coupled to the main fixing plate via the adjustment screw, and wherein the adjustment screw is pivotably coupled to the main fixing plate via a fixed spring-rotation shaft oriented parallel to the tilt axis.

5. The device of claim 1, further comprising a screw sleeve disposed within the tension spring, the screw sleeve configured to receive a top end of the adjustment screw.

6. The device of claim 1, further comprising an extendable arm coupled between the wall-mounting bracket and the main fixing plate, the extendable arm configured to extend the electronic display distally away from a wall.

7. The device of claim 6, wherein the elongated arm comprises a proximal arm portion and a distal arm portion, wherein the distal arm portion is configured to swivel relative to the proximal arm portion to extend the electronic display distally away from the wall.

8. The device of claim 6, wherein the eccentric gear defines an eccentric angle of about 20 degrees.

9. The device of claim 1, further comprising a pivot screw aligned with the tilt axis, the pivot screw configured to increase or decrease a frictional damping force between the display-mounting bracket and the main fixing plate.

10. The device of claim 1, further comprising the wall-mounting bracket.

11. The device of claim 1, wherein the adjustment screw extends upward through a bottom side of the main fixing plate.

12. A system comprising:
a wall-mounting bracket configured to removably couple to a wall;
a main fixing plate coupled to the wall-mounting bracket, the main fixing plate comprising an inner gear wheel;
a display-mounting bracket configured to removably couple to a backside of an electronic display, wherein:
the display-mounting bracket is configured to vertically tilt, relative to the main fixing plate, about a tilt axis passing through a pivot point of both the display-mounting bracket and the main fixing plate,
the display-mounting bracket comprises a proximal extension extending proximally to the pivot point, and
the proximal extension comprises an eccentric gear comprising a locking shaft, the eccentric gear being configured to engage with the inner gear wheel of the main fixing plate;
a tension spring comprising a lower end coupled to the main fixing plate, and an upper end coupled to the locking shaft of the eccentric gear, such that the tension spring retains a vertical-tilt orientation of the display-mounting bracket relative to the main fixing plate; and
an adjustment screw coupled to the lower end of the tension spring, wherein rotation of the adjustment screw expands or compresses the tension spring.

13. The system of claim 12, wherein the upper end of the tension spring defines a hook configured to hang on the locking shaft of the eccentric gear.

14. The system of claim 12, wherein a bottom end of the adjustment screw comprises an adjustment knob.

15. The system of claim 12, wherein the lower end of the tension spring is coupled to the main fixing plate via the adjustment screw, and wherein the adjustment screw is pivotably coupled to the main fixing plate via a fixed spring-rotation shaft oriented parallel to the tilt axis.

16. The system of claim 12, the mounting device further comprising a screw sleeve disposed within the tension spring, the screw sleeve configured to receive a top end of the adjustment screw.

17. The system of claim 12, the mounting device further comprising an extendable arm coupled between the wall-mounting bracket and the main fixing plate, the extendable arm configured to extend the electronic display distally away from the wall.

18. The system of claim 17, wherein the elongated arm comprises a proximal arm portion and a distal arm portion, wherein the distal arm portion is configured to swivel relative to the proximal arm portion to extend the electronic display distally away from the wall.

19. The system of claim 12, wherein the eccentric gear defines an eccentric angle of about 20 degrees.

20. A method comprising:
    providing a main fixing plate defining an inner gear wheel;
    providing a display-mounting bracket configured to removably couple to a backside of an electronic display, the display-mounting bracket comprising a proximal extension extending proximally to a pivot point, and the proximal extension comprising an eccentric gear comprising a locking shaft;
    providing a tension spring and an adjustment screw coupled to a lower end of the tension spring; and
    providing instructions comprising:
        engaging the eccentric gear with the inner gear wheel of the main fixing plate;
        coupling the lower end of the tension spring to the main fixing plate; and
        coupling an upper end of the tension spring to the locking shaft of the eccentric gear, such that:
            the display-mounting bracket is configured to vertically tilt, relative to the main fixing plate, about a tilt axis passing through the pivot point;
            the tension spring retains a vertical-tilt orientation of the display-mounting bracket relative to the main fixing plate; and
            rotation of the adjustment screw expands or compresses the tension spring.

* * * * *